Oct. 30, 1934.　　　H. JUNKERS　　　1,978,494
HOLLOW STRUCTURAL ELEMENT
Filed Nov. 12, 1930　　3 Sheets-Sheet 1
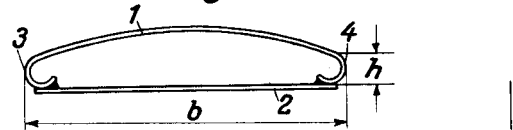
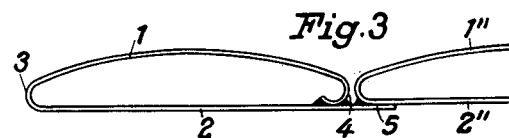
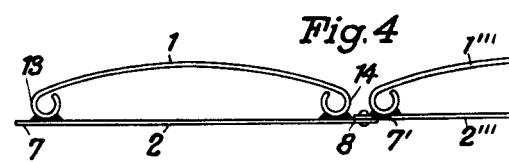
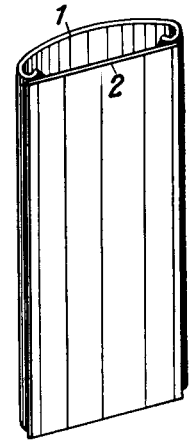
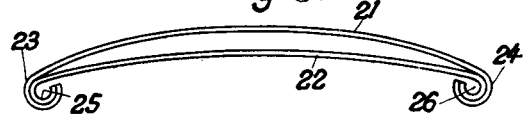
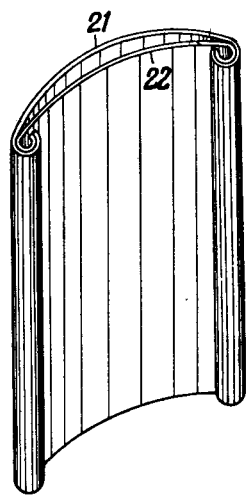
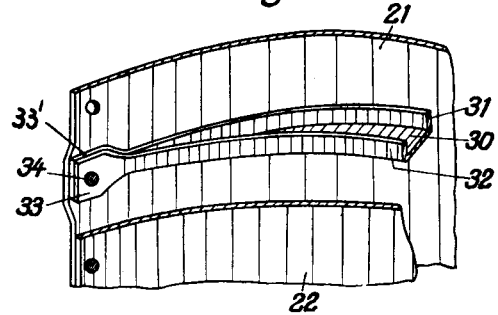
Inventor:
Hugo Junkers
by Karl Lindhauer
Atty.

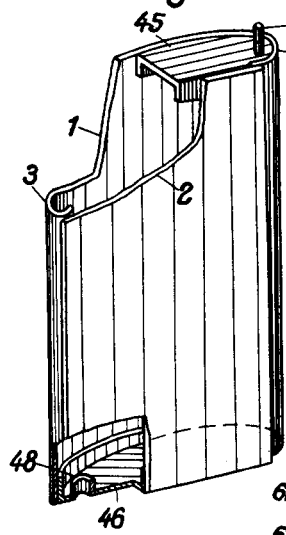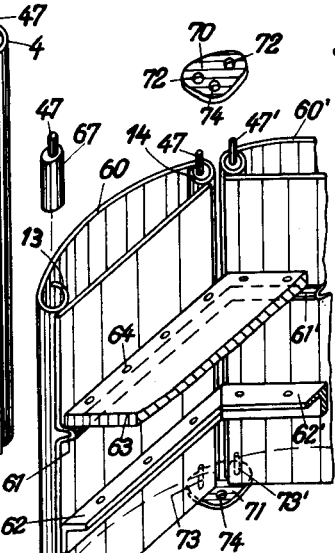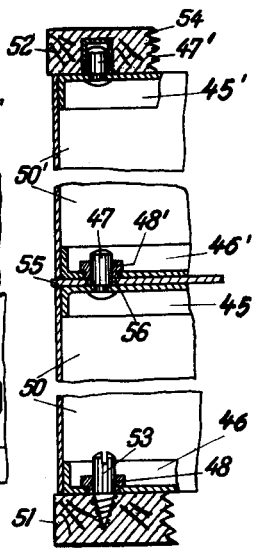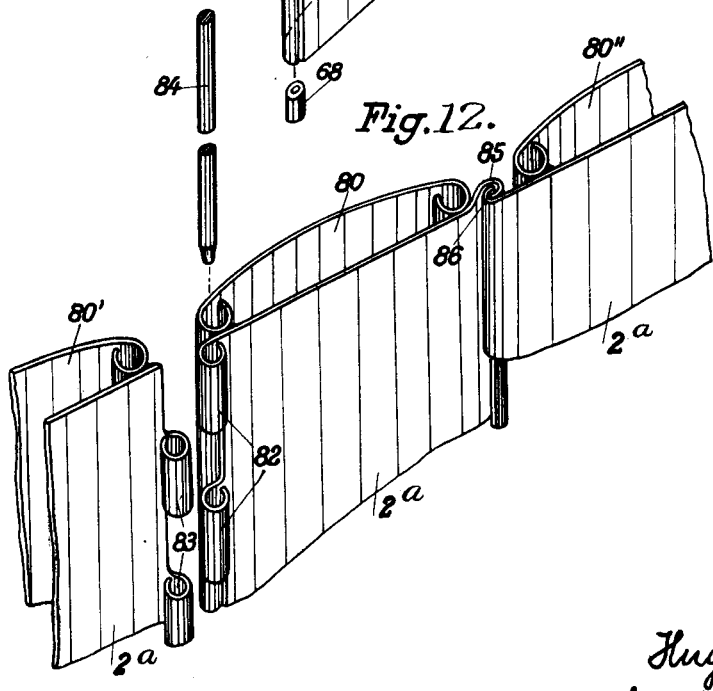

Oct. 30, 1934.  H. JUNKERS  1,978,494
HOLLOW STRUCTURAL ELEMENT
Filed Nov. 12, 1930  3 Sheets-Sheet 3

Inventor:
Hugo Junkers
by Karl ......
Atty.

Patented Oct. 30, 1934

1,978,494

UNITED STATES PATENT OFFICE 1,978,494

HOLLOW STRUCTURAL ELEMENT

Hugo Junkers, Dessau-in-Anhalt, Germany

Application November 12, 1930, Serial No. 495,134
In Germany November 23, 1929

12 Claims. (Cl. 189—34)

My invention relates to hollow structural elements, and more particularly to sheet-metal elements adapted for use in the construction of the walls of buildings, containers, articles of furniture, such as wardrobes, writing tables, seats and the like, or of parts of such structures or articles of furniture such as doors.

It is an object of my invention to improve structural elements of the type referred to.

To this end I form the elements with a front and a rear plate of suitable material, for instance, sheet metal, which may be parts of a single sheet, and I provide curved portions at the edges of the element where the front and rear plates are connected to each other, the radius of such portions being small in relation to the width of the element, which has an oblong section, its depth being less than its width, and at least one of its plates being arched toward the outside of the element.

Elements of this type as heretofore designed were either rectangular or semi-circular in cross section. A rectangular section implies flat walls the resistance of which to deformation is low, while elements of semi-circular section although being stronger, are not suitable for the construction of large walls, for, if the elements are small, too many elements are required, while with larger and fewer elements the depth of the elements becomes excessive. Elements having the sections referred to are therefore principally used for the steel insertions in concrete walls, but not as independent elements.

In an element designed in accordance with this invention one of the plates may be arched, normally slightly, while the other plate may be flat or also arched. In an element in which both plates are arched the archings may extend in opposite directions so that an element of lenticular section is obtained, or they may extend in the same direction so that one of the plates projects into the arched cavity of the other with its own arch and an element of crescent section is obtained. The edges of the elements are curved or rolled up with a radius which is small in relation to the width of the element, that is, the edges of the element are curved strongly as compared with the slight arching of its plate or plates. The element may be termed a flat, hollow member which is slightly arched to the outside at least on one of its faces, with narrow but strongly curved portions which may be semi-cylindrical or substantially cylindrical at the edges.

Such an element compares favorably with an element of rectangular section in strength, as its arched outer plate is more resistive against deformation and also more resilient. While in a flat plate a force acting on it from the outside, causes a purely local stress, in an arched plate the force is translated into thrust components at the edges of the plate which are absorbed by the curved portions under resilient reaction, and distributed onto the other plate.

The advantage offered by such elements as compared with elements of substantially semi-circular section has already been set out.

The two plates of the element may be connected in various ways. For instance one of the plates may be secured to the curved edge portions of the other plate by soldering, folding or by other suitable means. Both plates may form parts of a single sheet in which case only their free ends require being connected one may however also provide beads or creases along the edges of the plates, or along one edge of each plate only if the element is made from a single sheet, and roll up the beads or creases to connect the plates or their edges.

In most cases only one of the plates is arched while the other is flat. Preferably the flat plate is arranged on that side of the structure which is less exposed to local stresses. Means such as flanges or creases may be formed on or secured to the flat plates to serve for attaching floors, partitions, bracing members and the like.

However both plates may be arched and the archings may be so arranged with respect to each other that an element of lenticular or crescent-shaped cross-section is formed.

The strength of the elements, particularly against deformation and buckling, may be further increased by inserting therein suitably spaced braces or ribs which are connected to the elements in any suitable manner, such as by riveting, soldering, welding, or the like. If it is necessary to prevent access of moisture or other undesirable matter to the interior of the elements, or if it is desired to brace their ends, bulkheads are inserted at the ends of the elements and connected thereto, for instance by soldering, when a tight fit is required.

Elements according to this invention are particularly suitable for steel furniture as they are readily combined into wardrobes, tables, seats and the like, and are very strong on account of their favorable configuration and light in proportion. As the several elements are self-contained rigid units, their combination into a complete article is a simple problem as compared with the building up of furniture from sheet-metal plates. Only a few connecting members are required which are preferably so designed that the elements are assembled and disassembled by connecting and disconnecting the members, without any further operations. The ready disassembling facility is important for storing, shipping, and the like. The elements may also be readily designed as doors for furniture and other structures.

In the drawings affixed to this specification elements embodying my invention and structural units constructed with the aid of such elements are illustrated diagrammatically by way of example.

In the drawings

Figs. 1–8 illustrate various types of the new elements.

Fig. 1 is an end elevation of an element having separate front and rear plates, and Fig. 2 is a perspective view thereof.

Fig. 3 shows in end elevation two elements the front and rear plates of which are parts of a single sheet, and means for connecting the two elements.

Fig. 4 is an end elevation showing two elements of the type illustrated in Fig. 1 but with flanges projecting beyond their edges from the rear plate, for connecting the elements.

Fig. 5 is an end elevation, and

Fig. 6 is a perspective illustration, of an element having crescent section, with the sides of the front and rear plates rolled up into a bead or crease along the edges of the element, which bead or crease projects on the side of the rear plate.

Fig. 7 shows a similar element but with the beads or creases on the side of the front plate.

Fig. 8 is a perspective and partly sectional illustration showing a portion of an element with a brace inserted between its plates.

Fig. 9 is a perspective illustration, partly broken away and partly in section of an element the ends of which are closed by bulkheads, in combination with hole-and-pin means for connecting the ends of the element to those of other elements.

Figure 13:
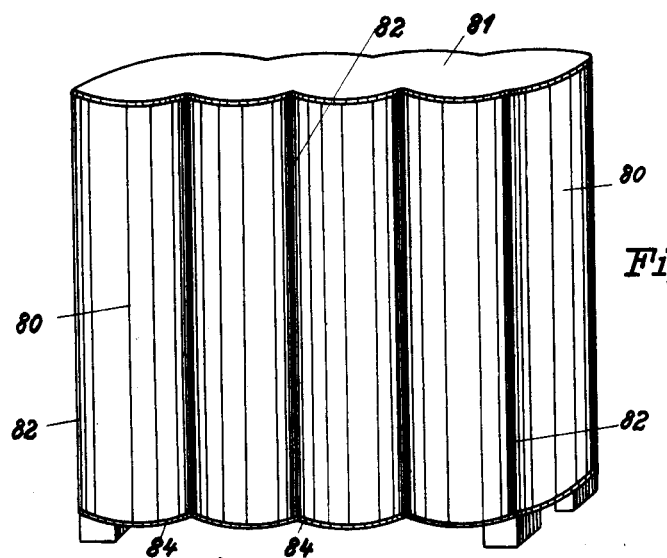
Figure 14:
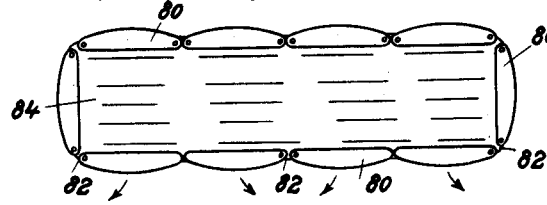
Figure 16:
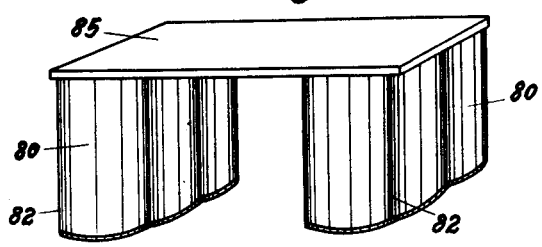
Figure 17:
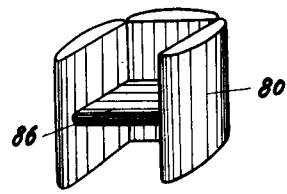
Figure 15:
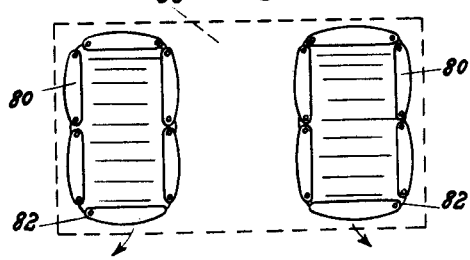
Figure 18:
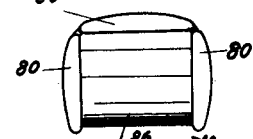

Fig. 10 is a section of a structure, for instance an article of furniture, which is built up from the elements illustrated in Fig. 9, Fig. 11 is a perspective illustration showing two elements of the type illustrated in Figs. 1 and 2, but provided with attaching means at their rear or inner plates, combined into a corner, Fig. 12 is a perspective illustration showing three elements of the type illustrated in Fig. 4 but connecter by members formed on their projecting flanges, Fig. 13 is a perspective view, and Fig. 14 is a horizontal section of a wardrobe, Fig. 15 is a perspective view, and Fig. 16 is a horizontal section of a writing desk, and Fig. 17 is a perspective view and Fig. 18 a plan view of a chair.

Referring to the drawings, and first to Figs. 1 and 2, 1 is the slightly arched front plate, and 2 is the flat rear plate, of an element having separate front and rear plates. 3 and 4 are the arched portions referred to at the edges of the front plate 1 which are curved on a comparatively small radius and are substantially semi-circular. $h$ is the depth of the curved portion, as indicated for the portion 4 at the right of the element and it will appear that this depth, which is substantially equal to the diameter of the curved portion, is small as compared with the overall width $b$ of the element. The overall depth of the element is considerably smaller than its width $b$, for the reasons stated. The flat rear plate 2 may be connected to the curved portions by any suitable means, for instance, soldering, as illustrated.

Referring now to Fig. 3, the two elements, with their arched front plates 1' and 1'' and their flat rear plates 2' and 2'', respectively, are designed with the same cross section as the element illustrated in Fig. 1 but each element is bent from a single sheet, with the curved portion 3 at the left intermediate but integral with the front and rear plates, and with the end of the rear plate connected to the curved portion 4 at the right, for instance, by soldering. Obviously, an element exactly like that illustrated in Fig. 1 may be obtained in this manner, but in the present instance the portion of the sheet which constitutes the rear plate 2 is extended beyond the curved portion 4 at the right-hand edge, forming a flange 5 to which the other element is connected. Obviously this element may be provided with a flange for connecting it to a third element, and so on.

The elements are connected at the flanges 5 by soldering, but obviously the connection may be effected by any other suitable means. If it is not necessary that the elements should be connected by flanges, the flanges may serve for bridging the joints of two adjacent elements.

Referring now to Fig. 4 the curved portions at the edges of the front and rear plates 1, 2 and 1''', 2''', respectively, which are shown separate as in Figs. 1 and 2, are rolled into substantially cylindrical beads or creases 13 and 14 which form stronger bracing ribs along the edges of the elements than the substantially semi-cylindrical portions 3 and 4, Figs. 1–3. The rear plates 2 and 2''', respectively, are connected to the rolled portions 13 and 14, for instance, by soldering, and each plate is provided with flanges 7 and 8 projecting beyond the edges of the element. The adjacent elements are equipped with corresponding flanges, as shown at 7' for the element at the right, and the flanges are connected, for instance, by riveting, as indicated.

Crescent-sectioned elements as shown in Figs. 5 to 7 are obtained by arching the front and rear plates 21 and 22 or 21', 22', Fig. 7. The plates of a crescent-shaped element may be connected by any one of the means described, or the elements may be made of a single sheet, like the elements illustrated in Fig. 3, but in the present instance, the plates are connected by rolling their edges into substantially cylindrical bracing ribs. The front plate 21 or 21' has curved portions 23 and 24 of substantially cylindrical cross-section which are bent about the correspondingly curved edges 25 and 26 of the rear plate 22 or 22', so as to form bracing ribs of extra strength.

As shown in Figs. 5 and 6 the bracing ribs project from the rear plate 22. However, this arrangement may be reversed as shown in Fig. 7 where the ribs constituted by the curved portions 23', 25' and 24', 26' project from the front plate 21.

Referring now to Fig. 8, 30 is a bracing member or rib which is inserted between the two plates 21 and 22 of a crescent-shaped element such as illustrated in Figs. 5–7, but obviously might be inserted in any one of the other elements illustrated. The bracing member 30 is of channel section with flanges 31 and 32 which near the ends of the member are widened into lugs 33 and 33'. The lugs are sandwiched between the front and rear plates 21 and 22, and the plates and lugs are connected by any suitable means, for instance, by a rivet 34. Obviously the connection at the right-hand edge of the element which is broken away in Fig. 8, is designed on the same lines. The edges of the two plates, together with the lugs of the bracing member, or members, are now curved as described, and preferably rolled into bracing ribs, as shown in Figs. 5, 6 and 7.

Fig. 9 shows an element similar to that illustrated in Figs. 1 and 2 but closed at the ends. 45 and 46 are bulkheads or end walls inserted at the upper and lower ends of the elements. The bulkheads may be connected to the plates 1 and 2 by any suitable means, but when it is desired to prevent penetration of moisture into the interior of the element, obviously the connecting means must be such as to make a tight fit, for instance, soldering or welding. If the elements are long, bracing ribs, not shown, may be inserted intermediate the bulkheads at the ends.

Means for connecting the elements may be provided on the bulkheads, Fig. 9 showing a pin 47 in the upper bulkhead 45 and a hole with a bush 48 in the lower bulkhead. Preferably each bulkhead is provided with a pin near one edge of the element and a hole near its other edge.

In Fig. 10 the structure, a corner of which is illustrated, may be a wardrobe such as will be described below, but it might also be any other structure. 50 and 50' are two superimposed elements, of which only the left-hand edges are shown, each element being equipped with bulkheads 45, 46 and 45', 46' at its upper and lower ends. The upper bulkheads of each element are equipped with pins 47 and 47', and the lower bulkheads are perforated for the reception of the bushes 48 and 48', respectively. 51 is the bottom plate of the wardrobe which is equipped with a pin 53 screwed into, or otherwise inserted in, the plate, for the reception of the bush 48 in the lowest bulkhead 46. 52 is the top plate of the wardrobe. It is equipped with a socket 54 for the reception of the pin 47' of the topmost bulkhead 45'. 55 is an intermediate partition which is inserted between the lower element 50 and the upper element 50' and is perforated at 56 for the reception of the pin 47 of the bulkhead 45. The partition not only acts as such but also serves for bracing the structure by maintaining the elements in the proper relative position.

It is to be understood that any structure or building may be built up from any number of elements in the manner described, with as many partitions or floors as desired intermediate the upper and lower ends.

If it is desired that the intermediate partitions or floors should not extend to the outside of the structure, as the partition 55 does in Fig. 10, means for attaching the partitions or floors to the flat rear plate of the elements may be provided, and a portion of a structure or article of furniture having such means is illustrated in Fig. 11. Two elements 60 and 60' are arranged at an angle so as to form one of the corners of the structure. These elements are without bulkheads and the connecting pins 47 and 47' are formed on the upper ends of plugs 67 which are inserted in the curved portions 13 and 14, at the upper ends of the elements 60, 61 while sleeves 68 are inserted in the same manner at their lower ends. A plug 67 with a pin 47, and a sleeve 68 are shown separately at the left of the element 60. 70 and 71 are end plates for connecting the elements at their upper and lower ends. The upper plate 70 is provided with holes 72 for the reception of the pin 47 and 47' and the lower plate 71 is provided with pins 73 and 73' which are adapted to engage in the sleeves 68 at the lower ends of the two elements. Each plate has a third hole 74 for the reception of a screw or the like by which the plate is secured to the top or the bottom plate of the structure, or to a partition, as the case may be.

The two elements are held in a definite position with respect to each other by the plates 70 and 71 but bracing members are preferably provided in addition to the plates. As mentioned, various means may be provided for attaching such members to the rear or inner plates of the elements. For instance, inwardly projecting creases 61 and 61' may be formed in the rear plates of the respective elements to which a bracing member, a shelf, a floor or the like, 63, is secured by screws or the like which are inserted in holes 64 near the inner edge of the member. If desired, angular brackets 62 and 62' may be provided instead of the creases. On the other hand, bracing means may be dispensed with altogether, and the plates 70 and 71, in combination with a top and a bottom plate, may alone be relied on for holding the corner elements in position.

It is to be understood that elements having bulkheads 45 and 46 at their ends as shown in Figs. 9 and 10 may be connected in a manner similar to that described with reference to Fig. 11.

It is not necessary that the bracing members 55, Fig. 10, or 63, Fig. 11, should be solid but they may be perforated plates or horizontal scaffolds, frames, lattice work, or the like.

The connections illustrated in Figs. 10 and 11 may be readily so designed as to constitute hinges, with one of the elements, or any number of them, mounted to turn on the pins 47, 53, or 73, to serve as doors.

If the plates 70 and 71 are permanently fixed on two adjacent elements, the elements will remain pivotally connected also after the top and bottom plates, and the bracing member or members, if any, have been removed, which is often desirable for shipping, storing and the like, because the structures, articles of furniture etc., may be folded up without elements getting lost or mislaid. Frequently the elements are pivotally connected only at the corners of the structure, article of furniture or the like, while at the other points they are rigidly connected.

It will be understood that the types of elements having their curved edge portions rolled substantially into cylinders, as illustrated in Figs. 4–7, and not curved into semi-cylinders only, are particularly suitable for the reception of connecting elements, such as the plugs 67 and the sleeves 68, while in the elements having the edge portion curved into semi-cylinders only, as shown in Figs. 1 to 3 and 10, bulkheads 45 and 46 must be inserted for supporting the pins 47 and the bushes 48, Fig. 9.

Detachable means for connecting the elements throughout their length are illustrated for two elements 80 and 80' in Fig. 12. Such connections are provided instead of the permanent connections illustrated in Figs. 3 and 4 when a tight fit between the several elements is required, or the intermediate bracing members, floors or the like such as 52 and 63, Figs. 10 and 11, are pitched far apart.

As shown in Fig. 12, the flanges which project from the inner plates 2a, 2a of the elements 80, 80' as shown in Fig. 4, are rolled into hollow cylinders 82, 83 so as to form a hinge in which a pin 84 is inserted.

The elements may also be connected by folding their flanges as shown at 85 and 86 for the elements 80 and 80''.

For separating the elements 80 and 80', the pin 84 is extracted, and for separating the elements 80 and 80'', they are displaced parallel to each other until the folds 85, 86 come apart.

In Figs. 13 and 14, 81 and 84 are the top and bottom plates of a wardrobe which is built up from elements similar to the element 80 in Fig. 12. As will appear from Fig. 15, the four elements making up the front wall of the wardrobe are hinged to each other and to the elements at the ends of the wardrobe at 82 so that two double doors are formed at the front of the wardrobe which open in the direction of the arrows, Fig. 14.

In Figs. 15 and 16, 85 is the board of a writing table having two bays each built up from elements 80, like the wardrobe in Figs. 13 and 14, but with a single door at the front end of each bay which doors are hinged to the elements at the outer side of the bays at 82.

Referring to Figs. 17 and 18, the sides and the back of a chair are formed by three elements 80 arranged in the shape of the letter U and the seat is a fourth element 86 which is inserted in the space surrounded by the three other elements, and secured to their flat rear plates by any suitable means, such as the creases 61, 61', or the brackets 62, 62' Fig. 11.

In Figs. 9 to 18 the plano-convex type of element illustrated in Fig. 4 has been shown by way of example. It is understood that the several constructions, structures and articles of furniture which have been described, may be built up from elements of any other type, or from a combination of various types of elements. For instance, elements having substantially cylindrical curved portions, as illustrated in Figs. 4 to 8, are particularly suitable as hinged members, such as doors and the like, for the reasons stated. This consideration does not apply to elements which are not connected by hinges, for instance, the elements forming the rear wall of the wardrobe, Figs. 13 and 14, and therefore these elements may be designed with the semi-cylindrical portions illustrated in Figs. 1, 2 and 3. When it is desired that hinged members should be closed at the top and at the bottom which generally applies to doors, the bulkhead type of Fig. 9 will be preferred.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A hollow structural element comprising a front and a rear plate, the depth of said element being less than its width, and one of said plates being arched toward the outside of said element, a bracing member inserted between said plates and having flat ends connected to and sandwiched between, said plates near their edges, and rolled up interengaging edges on said plates enclosing the ends of said bracing member and forming bracing ribs at the edges of said element.

2. A structure built up from hollow structural elements each comprising a front and a rear plate, curved portions at the edges of said element where said plates are connected to each other, the radius of said portions being small in relation to the width of said element, the depth of said element being less than its width, and one of said plates being arched toward the outside of said element, and a hinge connecting two of said structural elements.

3. A structure built up from hollow structural elements each comprising a front and a rear plate, curved portions at the edges of said element where said plates are connected to each other, the radius of said portions being small in relation to the width of said element, the depth of said element being less than its width, and one of said plates being arched toward the outside of said element, a bracing member extending from one of said elements to another element, and hole-and-pin connecting means at the ends of said element.

4. An article of furniture built up from structural elements each comprising a front and a rear plate, curved portions at the edges of said element where said plates are connected to each other, the radius of said portions being small in relation to the width of said element, the depth of said element being less than its width, and one of said plates being arched toward the outside of said element, and walls secured to said elements at the top and the bottom of said article.

5. An article of furniture built up from structural elements each comprising a front and a rear plate, curved portions at the edges of said element where said plates are connected to each other, the radius of said portions being small in relation to the width of said element, the depth of said element being less than its width, and one of said plates being arched toward the outside of said element, walls secured to said elements at the top and the bottom of said article, and intermediate partitions also secured to said elements.

6. An article of furniture built up from structural elements each comprising a front and a rear plate, curved portions at the edges of said element where said plates are connected to each other, the radius of said portions being small in relation to the width of said element, the depth of said element being less than its width, and one of said plates being arched toward the outside of said element, one of said elements constituting a door of the article, and a hinge connecting said door to the adjacent element.

7. A hollow structural element comprising front and rear plates and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, end plates inserted in said element at opposite ends thereof, and hinging means on said end plates arranged in the axis of the curved portion at one edge of said element.

8. A hollow structural element comprising front and rear plates and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, a transverse bracing member inserted in said element, and a folded flange at one edge of said element for connecting it to an adjacent element.

9. A structure built up from hollow structural elements comprising front and rear plates, and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, end plates inserted in said element at opposite ends thereof, a bracing member extending from one of said elements to another element, and means on said end walls for connecting said elements to said bracing member.

10. A hollow structural element comprising front and rear plates and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, a transverse bracing member inserted in said element, and curved portions of substantially cylindrical cross section at the edges of said element for connecting said element to adjacent elements.

11. A hollow structural element comprising front and rear plates and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, and hinging means arranged at opposite ends of said element and in the axis of the curved portion at one edge of said element.

12. A hollow structural element comprising front and rear plates and curved portions at the edges of said element whose radius is small in relation to the width of the element, said front and rear plates and said curved portions being equidistant throughout the length of said element, the depth of said element being less than its width, and one of the plates being slightly arched toward the outside of the element, with the arch arranged symmetrically with respect to the longitudinal axis of the element, and a hinge pin inserted in said curved portions.

HUGO JUNKERS.